United States Patent [19]
Faigle et al.

[11] Patent Number: 5,816,612
[45] Date of Patent: Oct. 6, 1998

[54] AIR BAG INFLATOR

[75] Inventors: Ernst M. Faigle, Imlay; John H. Semchena, Royal Oak; Richard J. Thompson, Imlay, all of Mich.

[73] Assignee: TRW Vehicle Safety Systems Inc., Lyndhurst, Ohio

[21] Appl. No.: 24,851

[22] Filed: Feb. 26, 1993

Related U.S. Application Data

[63] Continuation of Ser. No. 719,322, Jun. 21, 1991, abandoned.

[51] Int. Cl.$^6$ .................................................. B60R 21/26
[52] U.S. Cl. ........................... 281/740; 55/330; 55/486; 55/498
[58] Field of Search .................................. 280/736, 738, 280/740, 741, 742; 222/3; 55/323, 330, 307, 308, DIG. 45, 529, 498, 486; 210/483, 484, 489; 422/164

[56] References Cited

U.S. PATENT DOCUMENTS

| | | |
|---|---|---|
| 3,791,669 | 2/1974 | Hamilton ................................ 280/738 |
| 3,904,221 | 9/1975 | Shiki et al. . | |
| 3,931,019 | 1/1976 | Fowler ..................................... 210/485 |
| 3,938,826 | 2/1976 | Giorgini et al. ........................ 280/738 |
| 4,012,211 | 3/1977 | Goetz ................................. 280/740 X |
| 4,289,510 | 9/1981 | Herndon, Jr. . | |
| 4,322,385 | 3/1982 | Goetz ................................. 280/740 X |
| 4,402,830 | 9/1983 | Pall . | |
| 4,652,285 | 3/1987 | Greene ....................................... 55/498 |
| 4,817,828 | 4/1989 | Goetz ................................. 280/736 X |
| 4,846,368 | 7/1989 | Goetz ........................................... 222/3 |
| 4,858,951 | 8/1989 | Lenzen ..................................... 280/741 |
| 4,878,690 | 11/1989 | Cunnigham ............................. 280/741 |
| 5,028,070 | 7/1991 | Bender ..................................... 280/741 |
| 5,137,696 | 8/1992 | Hitachi et al. ............................. 55/498 |
| 5,248,162 | 9/1993 | Levosinski et al. ..................... 280/740 |

FOREIGN PATENT DOCUMENTS

| | | |
|---|---|---|
| 7420372 | 1/1975 | France . |
| 4012893 | 10/1991 | Germany . |
| 4102615 | 8/1992 | Germany . |
| 4220375 | 12/1992 | Germany . |
| 4239036 | 5/1993 | Germany . |
| 2045240 | 2/1990 | Japan . |
| 3151011 | 6/1991 | Japan .................................... 280/736 |

OTHER PUBLICATIONS

"Gelman Guide to Ultrafine Process Filtration", The Gelman Instrument Company GEL–3708, Mar. 1970, 12 pages.

*Primary Examiner*—Eric D. Culbreth
*Attorney, Agent, or Firm*—Tarolli, Sundheim, Covell, Tummino & Szabo

[57] ABSTRACT

An inflator for generating gas to inflate an air bag in a vehicle occupant safety apparatus comprises gas generating material, a plurality of filter layers, and a strand extending around the filter layers. The gas generating material generates gas when ignited. The filter layers filter the gas as it flows through the filter layers, and encircle the gas generating material. The filter layers include an outer layer with a cylindrical outer surface. The strand extends around the cylindrical outer surface of the outer filter layer at least partially in a helix, and has a plurality of circumferentially extending turns. The turns in the strand are spaced apart axially to define a helical gap which permits the gas to move from the cylindrical outer surface past the strand toward the air bag.

4 Claims, 3 Drawing Sheets

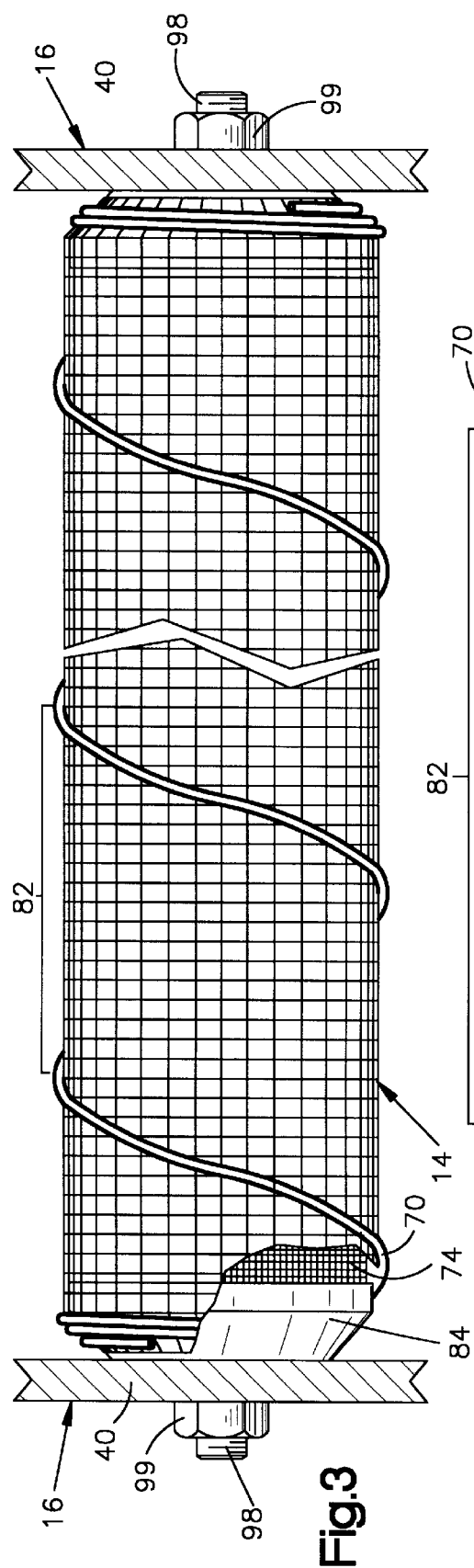
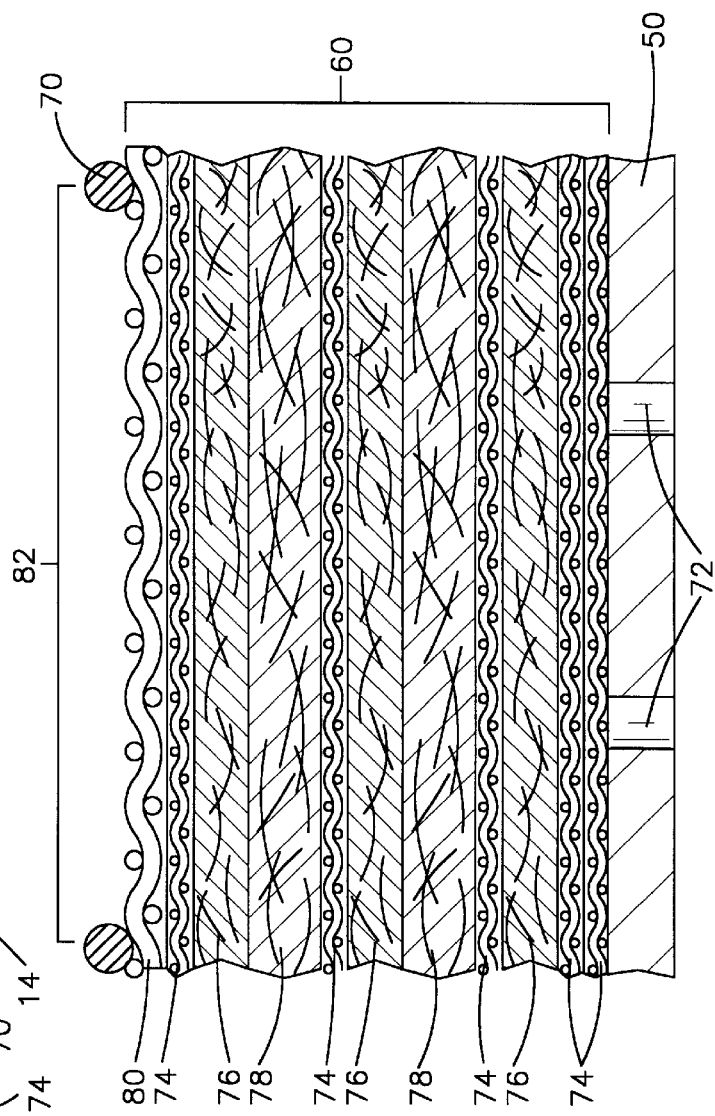

AIR BAG INFLATOR

This is a continuation of application Ser. No. 07/719,322, filed on Jun. 21, 1991, now abandoned.

FIELD OF THE INVENTION

The present invention relates to an inflator for generating gas to inflate an air bag in a vehicle occupant safety apparatus.

BACKGROUND OF THE INVENTION

U.S. Pat. No. 4,846,368 discloses an inflator for inflating an air bag which restrains movement of a vehicle occupant during a collision. The inflator includes a housing having a perforated cylindrical side wall and a pair of circular end walls. The housing contains a gas generating material and an igniter for igniting the gas generating material. The housing also contains a filter for removing particles from the gas generated by the gas generating material. The filter comprises a plurality of cylindrical filter layers wrapped around a perforated tube which contains the gas generating material.

When the air bag is to be inflated, the gas generating material is ignited and generates gas. The gas flows radially outward from the gas generating material through the perforated tube and into the surrounding filter layers. Particles are removed from the gas as the gas flows radially through the filter layers. After the gas flows through the filter layers, it flows radially outward through the openings in the side wall of the housing to inflate the air bag.

SUMMARY OF THE INVENTION

In accordance with the present invention, an inflator for inflating an air bag in a vehicle occupant safety apparatus comprises a gas generating material and a plurality of filter layers which encircle the gas generating material. The filter layers filter the gas as it flows from the gas generating material toward the air bag. The filter layers include an outer layer with a cylindrical outer surface. The inflator further comprises a strand which is wound around the cylindrical outer surface in a helix. The helically wound strand has a plurality of circumferentially extending turns which are spaced apart axially to define a helical gap between the turns. The helical gap permits the gas to move radially from the cylindrical outer surface past the strand toward the air bag.

An inflator constructed in accordance with the present invention advantageously has a simplified structure in comparison to the structures of inflators known in the prior art, because a structural housing for the filter is eliminated. The helically wound strand is in tension and applies a compressive force against the filter layers to hold them together.

In a preferred embodiment of the invention, the inflator includes a pair of end caps. The opposite axial ends of the outer filter layer extend over the end caps. The opposite ends of the helical strand also extend over the end caps, and wrap circumferentially around the end caps to clamp the ends of the outer filter layer firmly against the end caps. The strand thus holds the end caps and the filter layers together to form a cylindrical inflator structure without a cylindrical housing as known in the prior art.

BRIEF DESCRIPTION OF THE DRAWINGS

The foregoing and other features of the present invention will become apparent to those skilled in the art from reading the following description of a preferred embodiment of the invention in view of the accompanying drawings, wherein:

FIG. 3 is a schematic view of an inflator constructed in accordance with the invention; and FIG. 4 is a partial sectional view of the inflator of FIG. 3.

DESCRIPTION OF A PREFERRED EMBODIMENT

Figure 1:
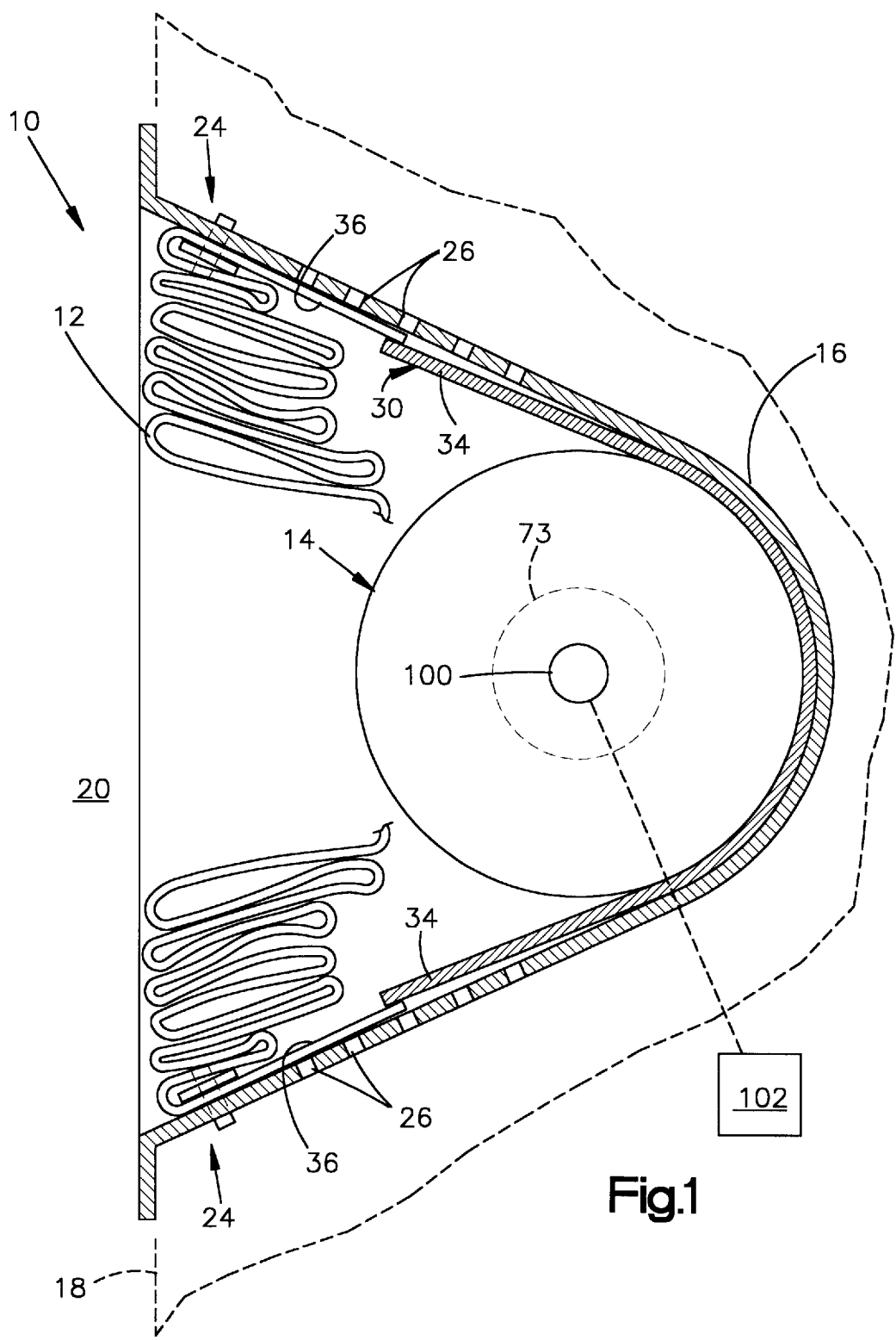
FIG. 1 is a schematic partial sectional view of a vehicle occupant safety apparatus including an inflatable air bag and an inflator constructed in accordance with the present invention.

As shown in FIG. 1, a vehicle occupant safety apparatus 10 includes an inflatable air bag 12 and an inflator 14 constructed in accordance with the present invention. The air bag 12 and the inflator 14 are housed in a reaction canister 16 which is mounted in the dashboard 18 of a vehicle. When the vehicle is involved in a collision, the air bag 12 is moved from a folded condition, shown in FIG. 1, to an inflated condition, shown in FIG. 2, by a rapid flow of gas from the inflator 14. When the air bag 12 is in the inflated condition, it extends rearward, relative to the vehicle, from the reaction canister 16 into the vehicle occupant compartment 20 to restrain forward movement of a vehicle occupant toward the dashboard 18.

The air bag 12 is connected to the reaction canister 16 by clamping assemblies 24. The reaction canister 16 has a plurality of ambient air flow openings 26 located between the inflator 14 and the air bag 12. A sheet of foil 30 provides a pair of flaps 34 extending rearward from the inflator 14 over several of the ambient air flow openings 26. Additional flaps 36 comprising edge portions of the air bag 12 extend forward from the clamping assemblies 24 over the remainder of the ambient air flow openings 26.

As shown in FIG. 3, the inflator 14 has an elongate cylindrical shape, and is mounted between a pair of side walls 40 of the reaction canister 16. As shown in FIG. 4, the inflator 14 comprises a central tube 50, a plurality of filter layers 60, and a strand 70. The central tube 50 has a plurality of gas flow openings 72 spaced apart along its length and circumference. A gas generating material 73 (FIGS. 1 and 2) is contained within the central tube 50.

The filter layers 60 include layers of wire screen 74, layers of steel wool 76, and layers of ceramic/glass wool 78. The layers 74–78 are assembled into the overlying relationship shown in FIG. 4 by laying out flat, flexible sheets of steel wool and ceramic/glass wool in overlying relationship with a flat, flexible sheet of wire screen, and by winding the overlying sheets around the central tube 50. The filter layers 60 also include a radially outer plenum layer 80 formed of wire screen. The wire screen of the plenum layer 80 has openings larger than the openings in the other layers 74 of wire screen.

The strand 70 is wrapped around the plenum layer 80. In the preferred embodiment, the strand 70 is a metal wire having a diameter of 0.07 to 0.09 inches (0.18–0.23 cm). As shown in FIG. 3, the strand 70 is wrapped in a helix, and has circumferentially extending turns which are spaced apart axially. The spaced apart turns of the strand 70 define a helically-shaped gap 82 that extends around the inflator 14 from one end of the inflator 14 to the other. The helically-shaped gap 82 permits gas to move radially outward from the cylindrical outer surface of the plenum layer 80 past the strand 70 toward the air bag 12. In the preferred embodiment, the circumferentially extending turns in the strand 70 have a 30 degree pitch and are spaced apart axially approximately 0.5 inches so that the helically-shaped gap 82 is several times wider than an opening in the underlying plenum layer 80.

Most preferably, the strand 70 is wrapped in tension so as to apply a radially directed compressive force to the filter layers 60. The radially directed compressive force presses the filter layers 60 together to eliminate any voids between individual overlying layers. The filter layers 60 are thus arranged to filter the gas uniformly along the length and around the circumference of the inflator 14.

Referring again to FIG. 3, the inflator 14 further comprises a pair of end caps 84. The end caps 84 cover the ends of the central tube 50 and the axial ends of the filter layers 60. The plenum layer 80 extends axially over the end caps 84. The opposite ends of the strand 70 extend in adjoining spiral loops 90 around the end caps 84 and the portions of the plenum layer 80 which overlie the end caps 84. The spiral loops 90 in the strand 70 are fixed in position, such as by welding if the strand 70 is formed of metal. The strand 70 thus binds together the filter layers 60 and the end caps 84 to hold the inflator 14 in a cylindrical shape as shown in FIG. 3.

Each end cap 84 includes a threaded stud 98 which extends through an opening in a side wall 40 of the reaction canister 16. A nut 99 is threaded onto each stud 98 to secure the inflator 14 in the reaction canister 16. One of the end caps also has a chamber in which an igniter 100 is mounted. The igniter 100 may be any suitable, known igniter for igniting gas generating material.

When the vehicle experiences a collision, a collision sensor 102 sends a signal to the igniter 100 which then operates to ignite the gas generating material 73. When the gas generating material 73 is ignited, it generates gas which flows rapidly outward from the central tube 50 through the gas flow openings 72 and into the filter layers 60. The unwanted products of combustion, such as hot particles, are removed from the gas as the gas flows through the filter layers 74–78 toward the plenum layer 80. The gas is also filtered as it flows through the plenum layer 80. The gas then flows through the helically-shaped gap 82 toward the air bag 12.

Figure 2:
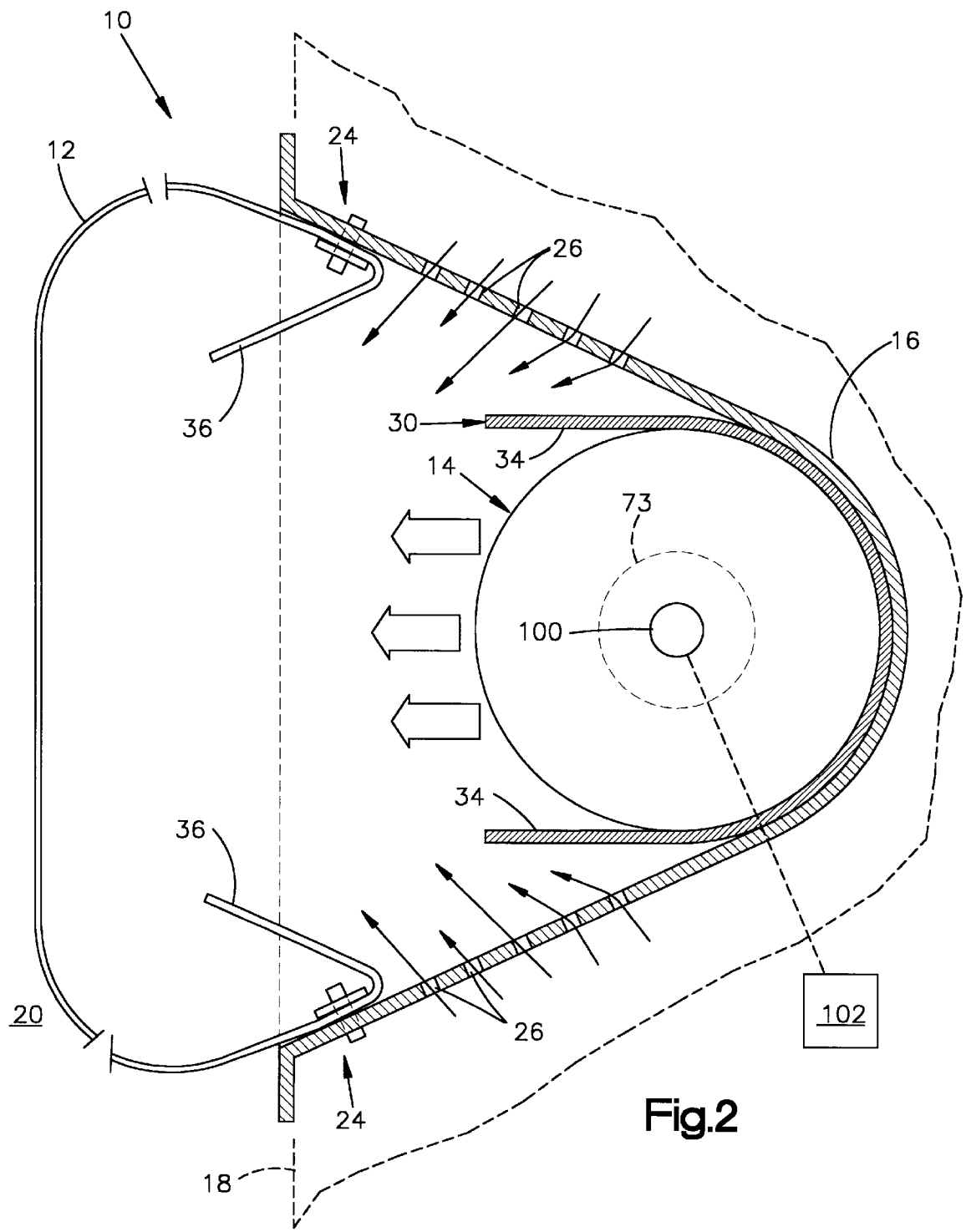
FIG. 2 is a view of the apparatus of FIG. 1 illustrating inflation of the air bag.

When the gas flows from the inflator 14 toward the air bag 12, as indicated by the large arrows in FIG. 2, the flow of gas causes a reduction in pressure inside the reaction canister 16 adjacent to the flaps 34 and 36. The reduction in pressure inside the reaction canister 16 causes ambient air outside the reaction canister 16 to flow inward through the ambient air openings 26 and past the flaps 34 and 36, as indicated by the small arrows in FIG. 2. The ambient air mixes with the gas in the reaction canister 16, and cools the gas. The ambient air also augments the flow of gas into the air bag 12, and thus reduces the amount of gas which must be generated by the gas generating material 73.

The invention has been described with reference to a preferred embodiment. However, improvements, changes and modifications will be apparent to those skilled in the art. For example, although the invention has been described as incorporating multiple layers of different materials, a single layer of a single material or a single layer of a mixture of materials may provide adequate filtering. Similarly, materials other than the materials described above may be used in the filter. Such improvements, changes and modifications are intended to be included within the scope of the appended claims.

Having described the invention, the following is claimed:

1. An inflator for generating gas to inflate an air bag in a vehicle occupant safety apparatus, said inflator comprising:

gas generating material which generates gas when ignited;

filter means for filtering the gas, said filter means including a filter structure having a generally cylindrical outer surface with first and second axial ends, said filter structure comprising a plurality of overlying porous flexible filter layers surrounding said gas generating material, one of said filter layers being the outermost porous flexible filter layer in said inflator;

wrapping means for pressing said filter layers together in overlying relationship, said wrapping means comprising a strand wrapped around said cylindrical outer surface of said filter structure and extending from said first axial end to said second axial ends said strand being wrapped in tension so as to apply a radially directed compressive force to said filter layers; and a first end cap adjacent to said first axial end of said cylindrical outer surface and a second end cap adjacent to said second axial end of said cylindrical outer surface, said strand having first and second axial end portions, each of said axial end portions being wrapped circumferentially entirely around a respective one of said end caps.

2. Apparatus as defined in claim 1 wherein said strand is a metal wire having a circular cross-section.

3. A cylindrical inflator for inflating a vehicle occupant restraint, said inflator comprising:

an ignitable gas generating material which, when ignited, generates gas for inflating the vehicle occupant restraint;

means for defining a pair of circular side walls, each of said side walls having a radially outer periphery;

a cylindrical tube extending axially between said side walls and being entirely spaced radially inward from said peripheries of said side walls, said tube having a cylindrical inner surface extending axially between said side walls and circumferentially around said gas generating material, said tube further having means for defining a plurality of gas flow openings for directing said gas to flow from said gas generating material in a direction radially outward through said tube and to flow between said side walls in a direction radially outward from said tube toward said peripheries of said side walls, said tube being the radially inner-most part of said inflator having gas flow openings for directing said gas to flow radially outward from said gas generating material;

a tubular filter having an outer surface with a generally cylindrical shape, said filter extending over said tube between said side walls and being circumferentially and axially continuous over said tube between said side walls, said filter including means for filtering said gas as said gas flows between said side walls in said direction radially outward from said tube toward said peripheries of said side walls; and holding means for holding said outer surface of said filter in said generally cylindrical shape between said side walls, said holding means including a strand having helical turns extending circumferentially entirely around said filter, a plurality of said helical turns being spaced from each other to define a gas flow space in a helical shape between said plurality of helical turns;

said helically shaped gas flow space having a width extending axially between adjacent ones of said plurality of helical turns and having a length extending circumferentially entirely around said filter a plurality of times, said helically shaped gas flow space being continuously open and free of obstructions between said plurality of helical turns throughout said width and length of said helically shaped gas flow space;

said strand being wrapped in tension around said filter so as to apply a radially directed compressive force through said filter from said outer surface of said filter to said tube, said force pressing said filter radially against said tube and holding said outer surface of said filter in said generally cylindrical shape between said side walls.

4. A cylindrical inflator for inflating a vehicle occupant restraint, said inflator comprising:

an ignitable gas generating material which, when ignited, generates gas for inflating the vehicle occupant restraint;

tubular means for containing said gas generating material, said tubular means defining a plurality of gas flow openings for directing said gas to flow radially outward from said as generating material into said tubular means, said gas flow openings being the radially innermost gas flow openings in said inflator that are located radially outward of said gas generating material;

said tubular means comprising filter means for filtering said gas as said gas flows radially outward from said gas generating material, said filter means having an outer surface with a generally cylindrical shape, said filter means being circumferentially and axially continuous over said gas generating material and being radially continuous from said gas flow openings to said outer surface; and holding means for holding said outer surface of said filter means in said generally cylindrical shape, said holding means including a strand having helical turns extending circumferentially entirely around said filter means, a plurality of said helical turns being spaced from each other to define a gas flow space in a helical shape between said plurality of helical turns;

said helically shaped gas flow space having a width extending axially between adjacent ones of said plurality of helical turns and having a length extending circumferentially entirely around said filter a plurality of times, said helically shaped gas flow space being continuously open and free of obstructions between said plurality of helical turns throughout said width and length of said helically shaped gas flow space;

said strand being wrapped in tension around said filter means so as to apply a compressive force radially inward through said entire filter means, said compressive force holding said outer surface of said filter means in said generally cylindrical shape.

\* \* \* \* \*